United States Patent [19]
Shannon

[11] Patent Number: 5,186,049
[45] Date of Patent: Feb. 16, 1993

[54] ANGULAR MOMENTUM AND BANKING INDICATOR ACCELERATION-DECELERATION AND GRADE INDICATOR SYSTEM

[76] Inventor: E. Paul Shannon, Rte. 2, Box 249, Killen, Ala. 35645

[21] Appl. No.: 772,886

[22] Filed: Oct. 8, 1991

Related U.S. Application Data

[63] Continuation-in-part of Ser. No. 589,329, Sep. 27, 1990, Pat. No. 5,134,883.

[51] Int. Cl.⁵ .............................................. G01C 21/00
[52] U.S. Cl. ...................................... 73/186; 73/146; 73/170.29; 73/170.07; 73/861.74
[58] Field of Search ................... 73/186, 188, 178 R, 73/146, 861.74, 861.75, 861.76, 189

[56] References Cited

U.S. PATENT DOCUMENTS

| | | | |
|---|---|---|---|
| 2,543,020 | 2/1951 | Hess | 73/186 |
| 2,633,028 | 10/1949 | Fillebrown | 74/5.6 |
| 2,780,937 | 2/1957 | Haynes et al. | 73/189 |
| 3,372,386 | 3/1968 | Klinger | 340/262 |
| 3,867,844 | 2/1975 | Shimizu et al. | 73/517 |
| 4,316,389 | 2/1982 | Shannon | 73/504 |
| 4,498,341 | 2/1985 | Breitbach et al. | 73/517 |
| 4,631,959 | 12/1986 | Motycka | 73/189 |
| 4,984,459 | 1/1991 | Shannon | 73/178 |
| 5,134,883 | 8/1992 | Shannon | 73/170 A |

Primary Examiner—Donald O. Woodiel
Attorney, Agent, or Firm—Hugh D. Jaeger

[57] ABSTRACT

Angular momentum and banking indicator and acceleration-deceleration and grade indicator for use on trucks, cranes, airplanes, and boats as a multipurpose sensor. A cylinder with a damping fluid includes four symmetrically spaced coils centered radially about a centrally located powered coil in a base of the cylinder and a pendulum suspended from a top of the cylinder which swings over the coils. Coils connected to a signal processing system which provides an angular momentum and banking signal and an acceleration and deceleration or grade indicator signal.

2 Claims, 10 Drawing Sheets

ANGULAR MOMENTUM AND BANKING INDICATOR ACCELERATION-DECELERATION AND GRADE INDICATOR SYSTEM

CROSS REFERENCES TO CO-PENDING APPLICATIONS

This application is a continuation-in-part of U.S. patent application Ser. No. 07/589,329, filed Sept. 27, 1990, entitled "Angular Momentum and Banking Indicator and Acceleration/Deceleration Grade Indicator System".

BACKGROUND OF THE INVENTION

1. Field of the Invention

The present invention pertains to an angular momentum and banking indicator and acceleration-deceleration and grade indicator system.

2. Description of the Prior Art

There has been a long standing need for an economical system which will indicate angular momentum and banking or acceleration-deceleration and grade information. Prior art systems have usually been limited to those applied to the aeronautical markets which are expensive to purchase, expensive to maintain and highly impractical for the ordinary individual to purchase.

Banking, as used by civil engineers on land type of base systems, refers to transverse slope on a track for a highway, which is usually used on curves to maintain traction. Highway engineers sometime refer to the term as super elevation. On highways, banking does not exceed 8 percent. Grading is a term referring to the rise in the longitudinal directional track or road. A one percent grade indicates a rise or fall of one foot in a hundred feet. When federally funded, highway grade does not exceed 6 percent. Prior art systems, such as gyroscopes, cannot tell whether a track or road is properly banked. One example is the use of a banking indicator for lubrication of track while a train is traveling. Trains have systems for sensing the need for lubrication and applying it to the wheels so that the track is lubricated. These oiler systems are activated by a gyroscope. Prior art gyroscope tend to either over oil or under oil. If the train is traveling at the proper speed for the bank, no additional lubrication is needed for either rail. If the train travels slower than the speed at which the road is banked for, the inside rails need more lubrication. If the train is traveling faster than the speed for which the track is banked, then the outside rails need extra lubrication. A prior art gyroscope can only sense direction and rate of the turn being made. This information is not sufficient for sensing conditions of a speeding train and properly lubricating. As a result, prior art devices either waste lubrication or under lubricate which results in track wear and extra fuel consumption. What is needed is a banking indicator which can tell whether the track is properly banked for the train speed and apply lubrication as needed. Over oiling can be a pollution problem, and a device is needed to properly sense bank so that oiling is appropriate.

Another prior art problem with gyroscope systems and other rate of turn indicators is side slippage or lack of headway on river craft. When moving multiple barges with a tow boat, the headway position on a river can be quite critical, especially when approaching a lock. If a boat with a large tow is struggling to make a lock, there is a great deal of uncertainty whether the currents will allow the tow to properly be moved into the lock. If it is known far enough in advance that the string of barges may not be moved into the lock, the tow boat may stop, tie off some of the barges, and make separate trips to the lock. Hours of time may be wasted in attempting to get a long tow through the lock. What is needed is a speed indicator that can indicate whether headway is being made in a river relative to the moving water and the shore.

When tow boats move away from a dock they very gradually gain speed. Their acceleration or deceleration is extremely slow. Their acceleration, and perhaps even the speed relative to the bank, actually stops. The boats may loose headway and start going backwards. It is difficult to note the moment when headway is lost. An indicator is needed which can immediately tell whether headway is lost and advise the tow boat whether to adjust its load of barges.

One particular example of a system which has always been in demand is a tilt indicator for a crane. Another system which is in demand is a braking indicator for vehicles. Another system which has been in demand is an acceleration-deceleration for trucks. Neither of these various systems for these types of transportation industries have been produced or sold on a cost effective basis and readily available.

The present invention overcomes the disadvantages by providing a system which is unique, novel and cost effective which fulfills a long standing need.

SUMMARY OF THE INVENTION

The general purpose of the present invention is to provide an angular momentum and banking indicator and acceleration-deceleration and grade indicator which can be used in such transportation purposes such as trucks, cranes, trains, and ships. The purpose of the system is to provide an indication of either momentum, banking, acceleration, deceleration or grade information which is obtained through a signal processing circuit. The system can be easily utilized by any individual, is easy to install by any individual and is cost effective.

According to one embodiment of the present invention there is provided an angular momentum and banking indicator and acceleration-deceleration and grade indicator including a cylinder, a plurality of radially, symmetrically and equally spaced coils centered about a central powered coil in the base of the cylinder, a pendulum suspended on a flexible wire or string from the top of the cylinder and over the central powered coil and the radially and equally spaced coils, a damping fluid within the cylinder, and the four radially, symmetrically and equally spaced coils connected to a single processing system for processing the signal indicating one of the modes from the group of momentum banking acceleration-deceleration and grade.

An alternative embodiment of the present invention includes a vertical armature spaced below the plurality of radially, symmetrically and equally spaced coils. A flexible rod is attached to the armature through a waterproof connector. The rod extends down into water. Movement of the water relative to the boat on which the indicator is mounted is reflected moving the armature relative to the coils.

Devices constructed according to the present invention are virtually indestructible and wear free. There are no moving parts or sensitive adjustments which may be broken or worn. No maintenance is required in the system. The durability and low maintenance aspects are extremely important in the application as discussed above, such as locomotive on-board lubricating systems and tow boat speed indicators. The device is simpler and easier to produce than prior art devices, such as gyroscopes.

Significant aspects and features of the present invention include an angular momentum and banking indicator and acceleration-deceleration and grade indicator system which provides an indicator which reads out a numerical display for the mode of operation. Usually an analog display is utilized as a preferred display for the system. Any other types of displays can be utilized such as a LED light bar display, a digital readout or other suitable or appropriate graphics.

Having thus described the preferred embodiments of the present invention, it is a principal object hereto to provide an angular momentum and banking indicator and acceleration-deceleration and grade indicator system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
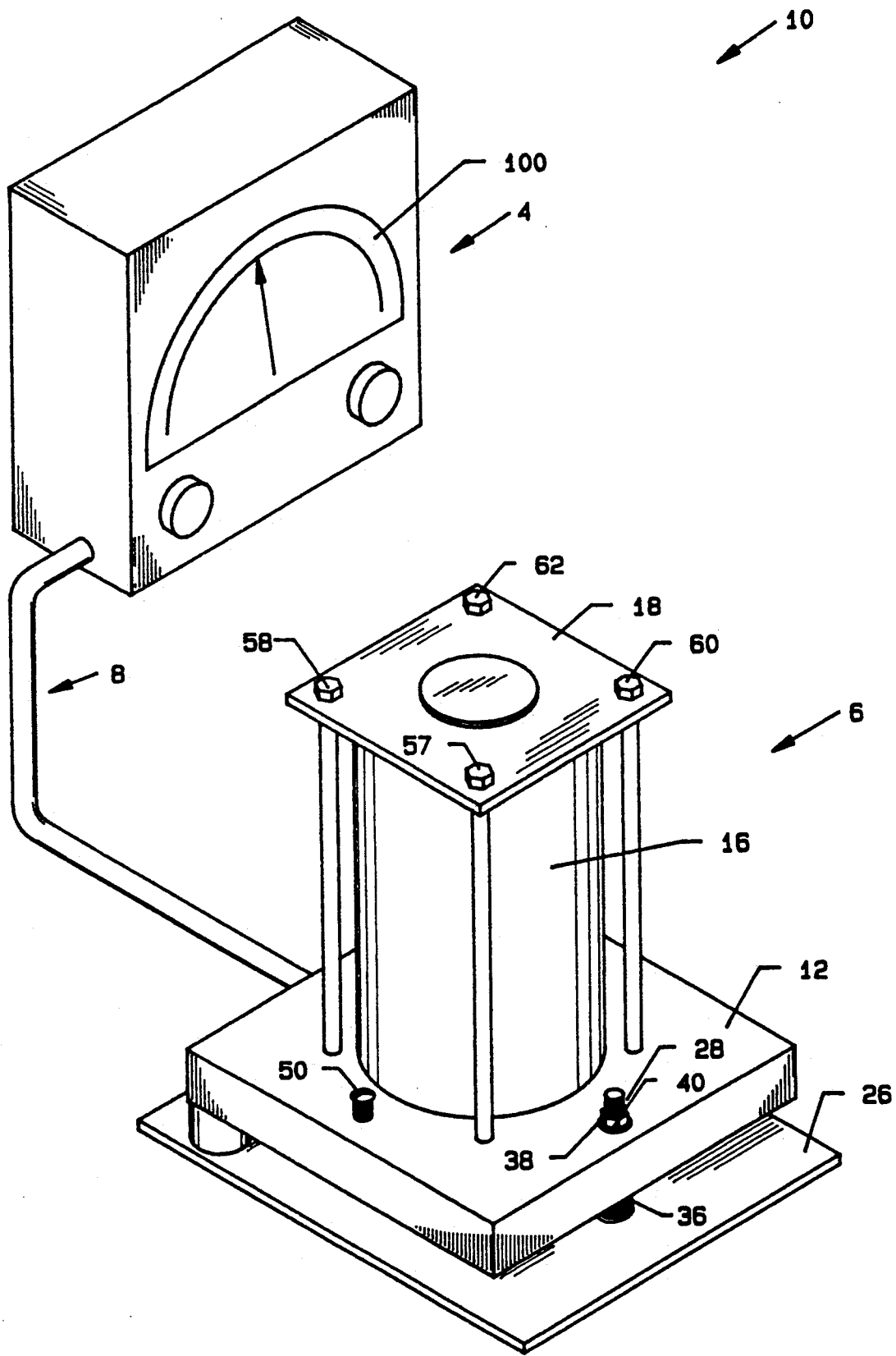
FIG. 1 illustrates front view of the angular momentum and banking indicator and accelerationdeceleration and grade indicator system, the present invention.

FIG. 1 illustrates a perspective view of an angular momentum and banking indicator and acceleration-deceleration and grade indicator system 10, herein known also as the grade indicator system 10. The grade indicator system 10 includes an indicator device 4, a sensing assembly 6, and a connecting cord 8 therebetween. The major components of the sensing assembly 6 includes a base 12, a cylindrical housing 16, a rectangular top 18 in alignment with each other and secured to a platform 26.

Figure 2:
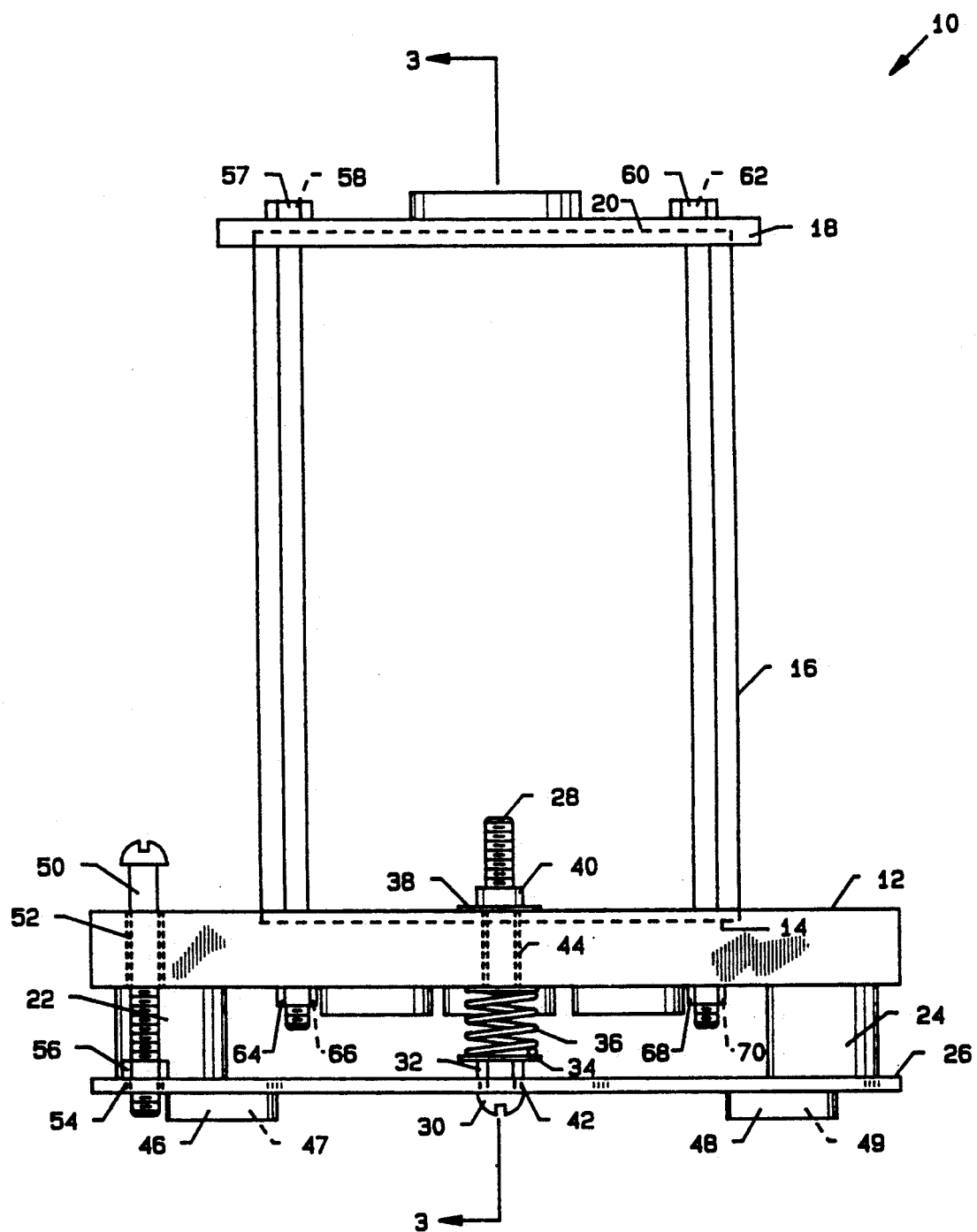
FIG. 2 illustrates a front view of the sensing assembly of the momentum and banking indicator and acceleration-deceleration and grade indicator system.

FIG. 2 illustrates a front view of the sensing assembly 6 of the angular momentum and banking indicator and acceleration-deceleration and grade indicator system 10 including a base 12 with a circular dished out area 14 for supporting and sealing the cylindrical housing 16 and a top 18 including a circular dished out area 20 for sealing against the cylindrical housing 10. Two rear feet 22 and 24 support the base 12 with respect to a platform 26. The two rear feet 27 and 24 are bonded to the base 12 and the platform 26, and serve as a hinge therebetween. A forward machine screw 28 includes a head 30, a nut 32, a washer 34, a spring 36, a washer 38 and a nut 40 provide an adjustable forward support. The machine screw 28 extends through holes 42 and 44 respectively. The spring biased screw assembly including machine screw 28 provides adjustment for the angular momentum and banking indicator of the system. Feet 46, 47, 48 and 49 secure to the underside of the platform 26. A machine screw 50 extends through holes 52, threaded hole 54 and includes an adjustment nut 56. Bolts 57, 58, 60 and 62 and nuts 64, 66, 68 and 70 extend through the top 18 and through the base 12 respectively to secure the top 18, the cylindrical housing 16 and the base 12 together.

Figure 3:
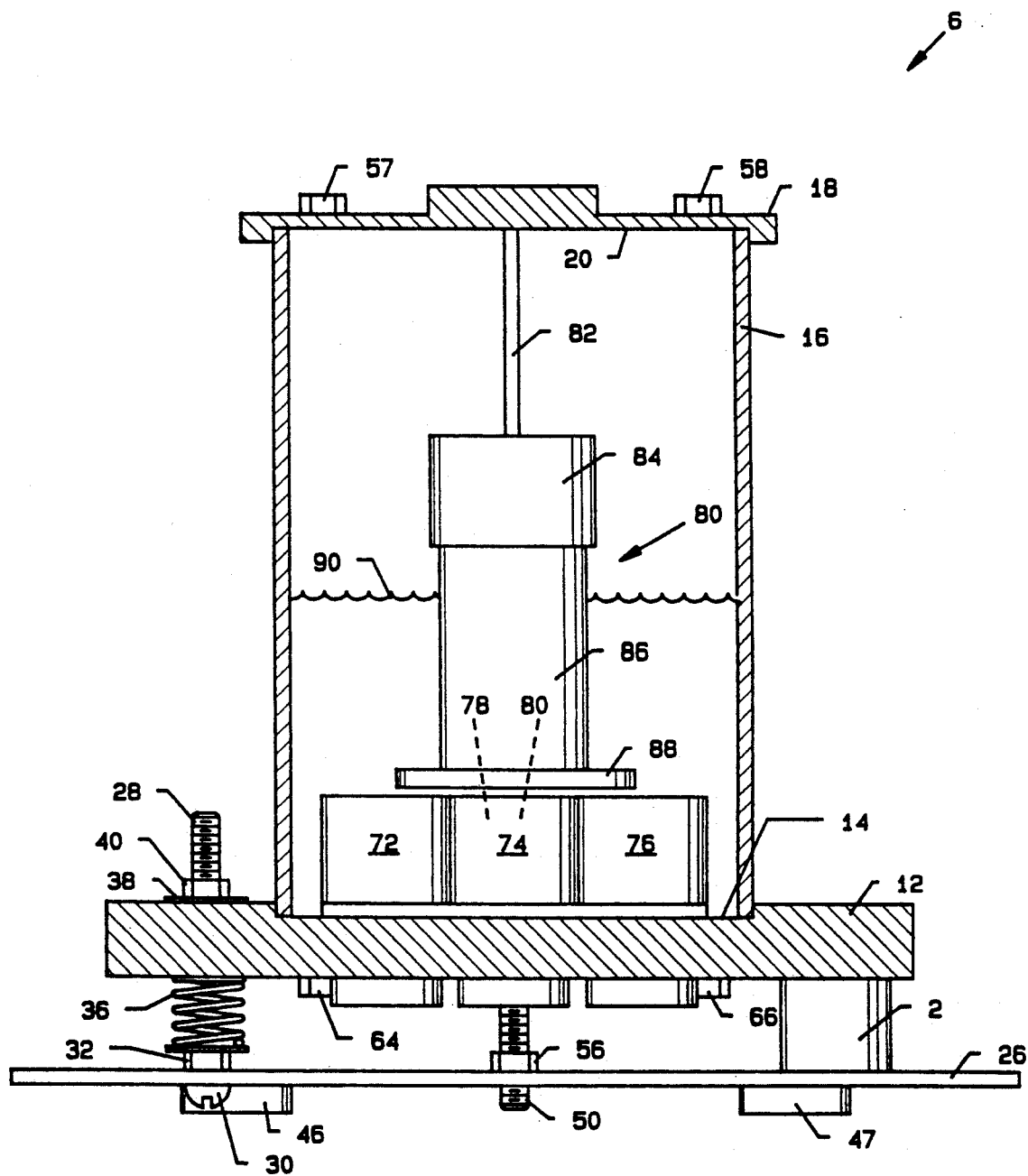
FIG. 3 illustrates a partial cross section view of the sensing assembly along viewing line 3-3 of FIG. 2.
Figure 4:
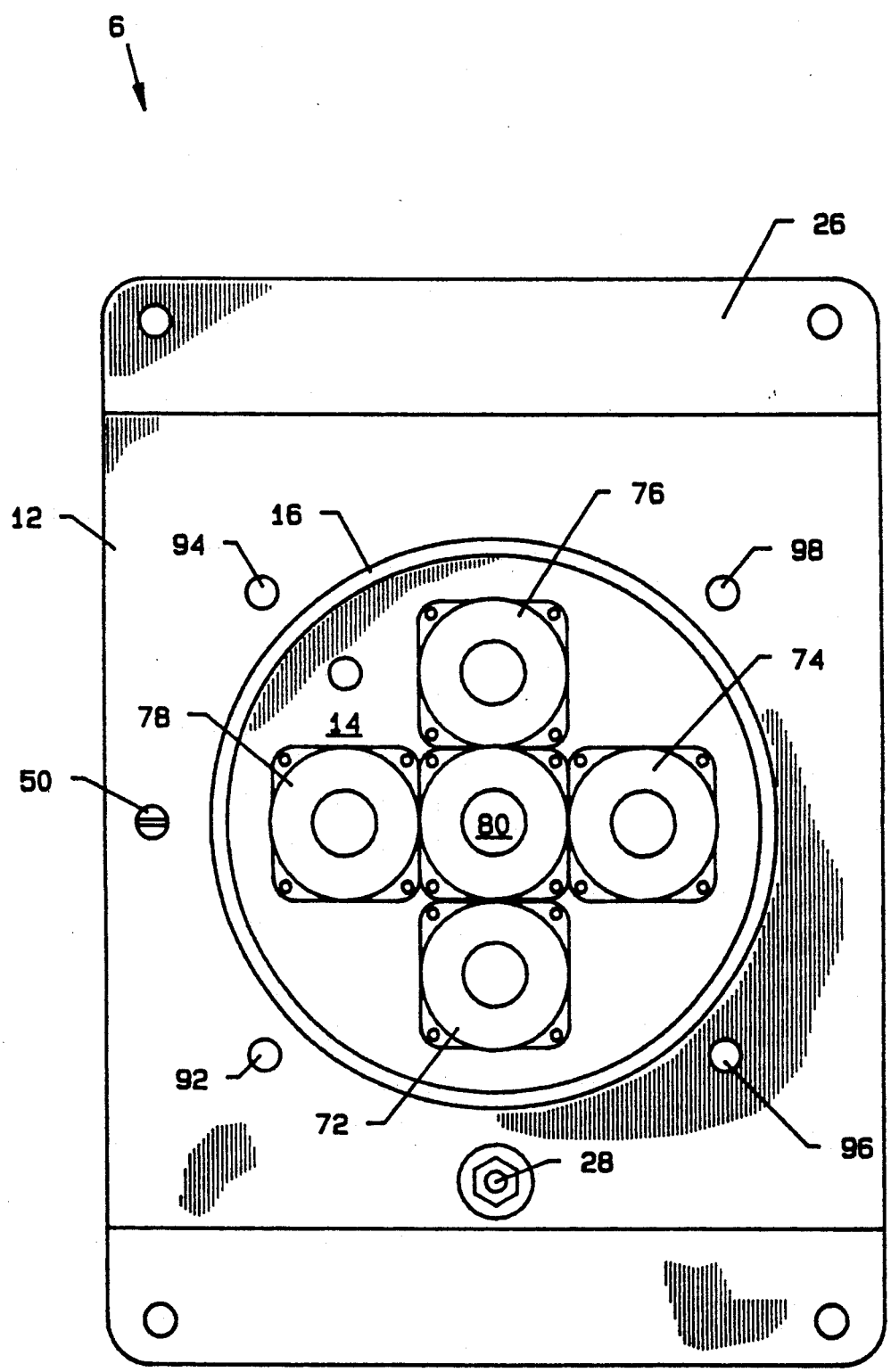
FIG. 4 illustrates a top view of the sensing assembly of the angular momentum and banking indicator and acceleration-deceleration and grade indicator system with the top and pendulum removed.

FIG. 3 illustrates a partial cross section view of the sensing assembly 6 along viewing line 3—3 of FIG. 2 where all numerals correspond to those elements previously described. A plurality of radially, symmetrically and equally spaced coils including coils 72, 74, 76, and 78 and central powered coil 79 align on the base 12 and in the dished out area 14 of the base 12. The bottoms of the coils 72-79 align with holes in the base 12 and are secured by a plurality of screws 82a-82n which protrude through the base 12 into threaded holes in the bottom of each of the coils 72-79. The alignment of the coils 72-79 with respect to each other is illustrated in FIG. 4. A pendulum 80 is suspended by a flexible wire 82 or other flexible like means from the top 18. The pendulum 80 includes a sleeve 84 connected to the wire 82, a cylindrically shaped main body 86 which frictionally engages or otherwise affixes within the sleeve 84 and a pendulum bottom base 88 secured to and aligned with the main body 86. A damping fluid 90 such as oil is added to the interior of the cylindrical housing 16 to dampen the movement and motion of the pendulum 80 over the coils 72, 74, 76, 78 and 79. The bottom base 88 of the pendulum 80 can be arched in lieu of being flat. The design and shape of the pendulum is not critical as long as the pendulum base is of sufficient area to cover the coil areas during one of the modes of operation.

FIG. 4 illustrates a top view of the sensing assembly 6 with the top 18 removed and the pendulum 80 removed including four radially, symmetrically and equally spaced coils 72, 74, 76, and 78 and centrally located powered coil 79 where all numerals correspond to those elements previously described. The coils 72, 74, 76 and 78 are radially, symmetrically and equally spaced about the central powered coil 79 and are equidistant from the central powered coil 79 and equidistant from each other. In a state of rest or when no grade is encountered, the axis of the pendulum 80 and the vertical axis of the central powered coil 79 are in line with each other causing little or equal flow of current from the central powered coil 79 through the centrally aligned bottom base 88 to the coils 72-78. Movement of the pendulum 80 and its induced current flow in any particular coil 72-78 from the central coil 79 through the pendulum bottom base 88 proportional to the displacement of the bottom base 88 toward or away from one or more of the coils 72-78.

Figure 5:
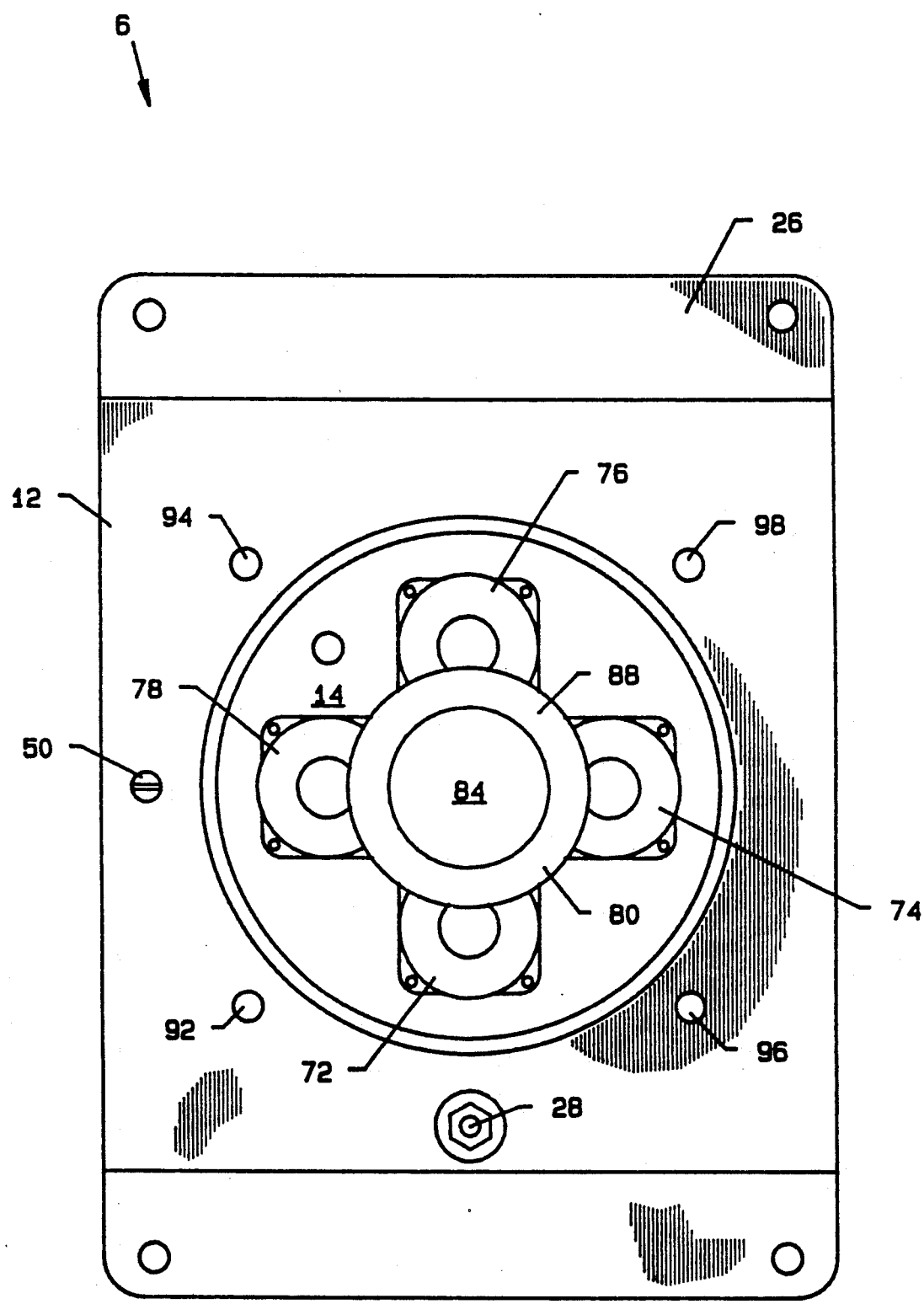
FIG. 5 illustrates a top view of the sensing assembly of the momentum and banking indicator and acceleration-deceleration and grade indicator system and the pendulum.

FIG. 5 illustrates a top view of the sensing assembly with the top 18 removed. Particularly illustrated is the alignment of the pendulum 80 over the coils 72, 74, 76, 78 and 79. As motion or encountering of a grade occurs, the pendulum 80 traverses across the coils 72, 74, 76, 78 and 79, and currents are sent through the rectifiers 104, 106, 108 and 110 and displayed on the meters 100 and 102 as illustrated in FIG. 6.

Figure 6:
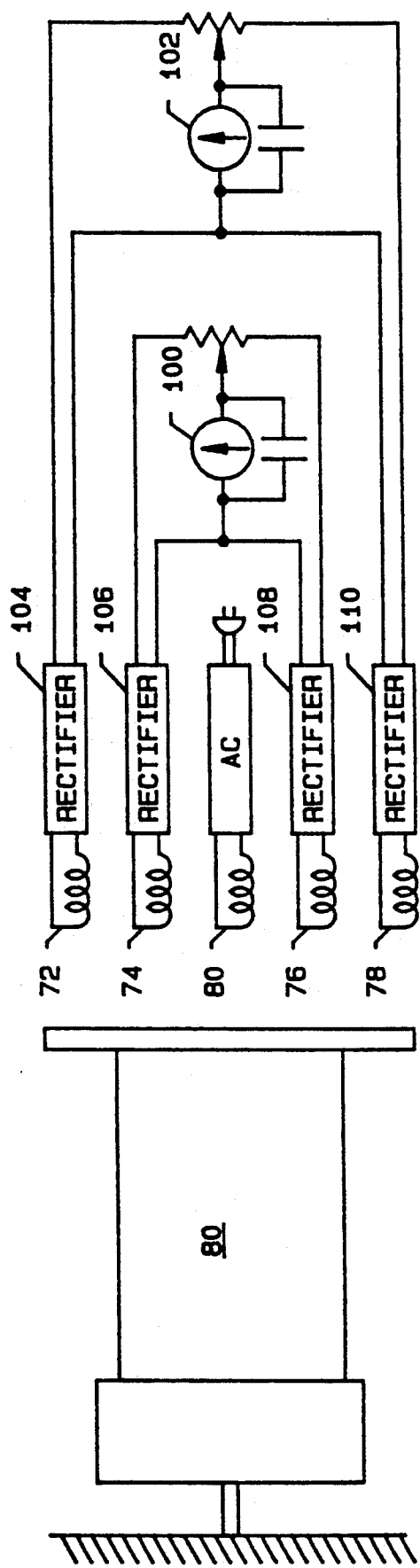
FIG. 6 illustrates an electrical circuit schematic diagram of the angular momentum and banking indicator and acceleration-deceleration and grade indicatory system.

FIG. 6 illustrates an electrical circuit schematic diagram of the four coils 72, 74, 76 and 78 connected to display meters 100 and 102. In an alternative mode, a switch could be used to switch between the coils to indicate the appropriate mode of operation on an indicator meter such as on the indicating device 4 of FIG. 1 depending upon the operator's selection.

The four coils 72, 74, 76 and 78 are symmetrically spaced around the centrally located powered coil 79 which is energized by alternating current, such as the line power indicated in FIG. 6. The energy from the centrally located coil 79 is distributed to coils 72-78 by bottom base 88 attached to pendulum 82. Base 88 is preferably a ferrous disk.

Each coil 72-78 has an output voltage, the value of which is determined by position of pendulum 80, the strength of the AC current in center coil 79 and electrical nature of the coils 72-78. The spacing of the pendulum above coils 72-78 may be adjusted to affect sensitivity. The further pendulum 80 is away from pole pieces determines how sensitive the system is.

Figure 7:
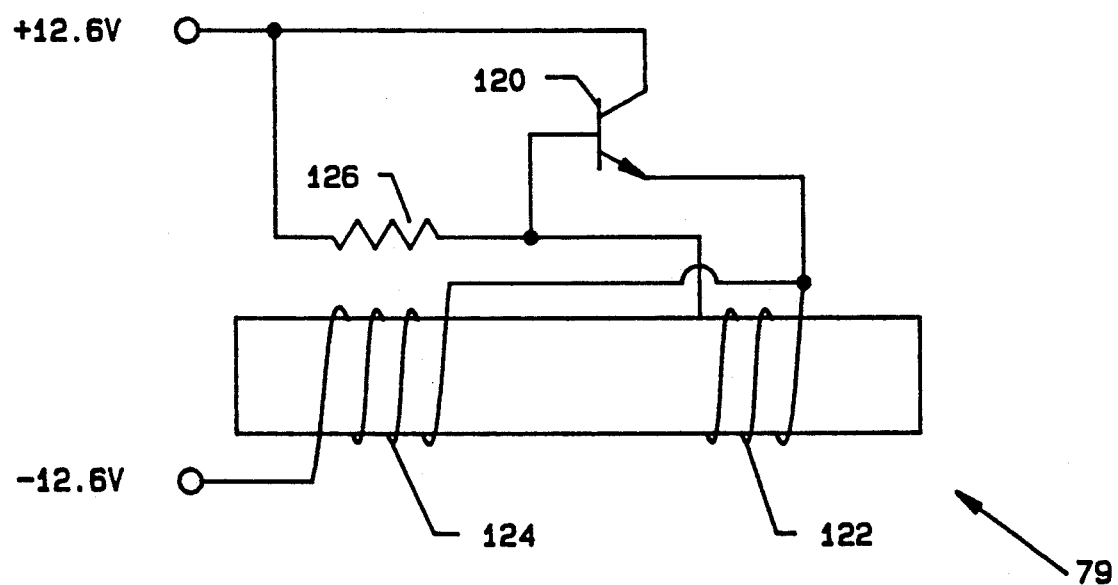
FIG. 7, an alternative embodiment, illustrates a circuit for producing AC current from a DC source.

FIG. 7 illustrates an alternative circuit for providing an alternating current to center coil 79 from a battery. If the system is operated from a DC power source, such as a storage battery, an oscillator, such as illustrated in FIG. 7, is used to provide the alternating current. FIG. 7 NPN transistor 120 is an Archer TIP 3055 for example. Coils 122 and 124 form the center coil 79. The center coil 79 can have two windings, such as illustrated, or one center-tapped winding, which in conjunction with transistor 120 and resistor 126 form a blocking oscillator. Resistor 126 is 330 ohms, but may vary depending on the characteristics of the other components involved.

Figure 8:
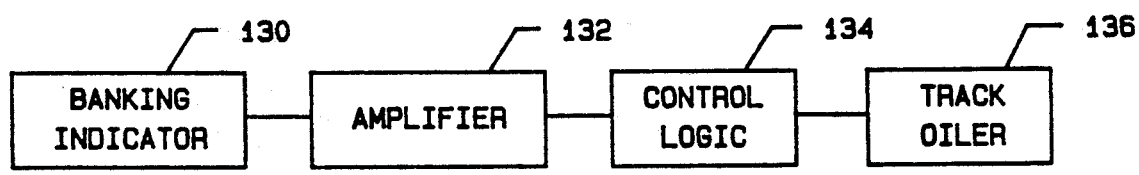
FIG. 8, an alternative embodiment, illustrates the present invention in schematic form.

FIG. 8 illustrates an embodiment of the present invention in use in a railway or track oiler in schematic form. Banking indicator 130 is constructed according to the present invention, and takes the place of the system of prior art devices such as gyroscopes. Signals from banking indicator 130 are provided to an amplifier 132 as necessary for the particular application. The amplified signal is then processed by control logic 134. Control logic can determine from the signals from coils 72-78 whether the speed of the train is appropriate for the bank. Control logic 134 then signifies oil 136 to oil the wheels on the appropriate rail if needed as a function of the speed of the train and the bank of the track.

The system constructed according to the present invention provides information for any of the listed applications not available in the prior art devices. Logic devices, such as control logic 134, in fact are only some of the outputs of coils 72-78. In a boat application for use in a river, the logic determines the direction the boat is sliding, how fast the load is sliding, and whether headway is lost.

Figure 9:
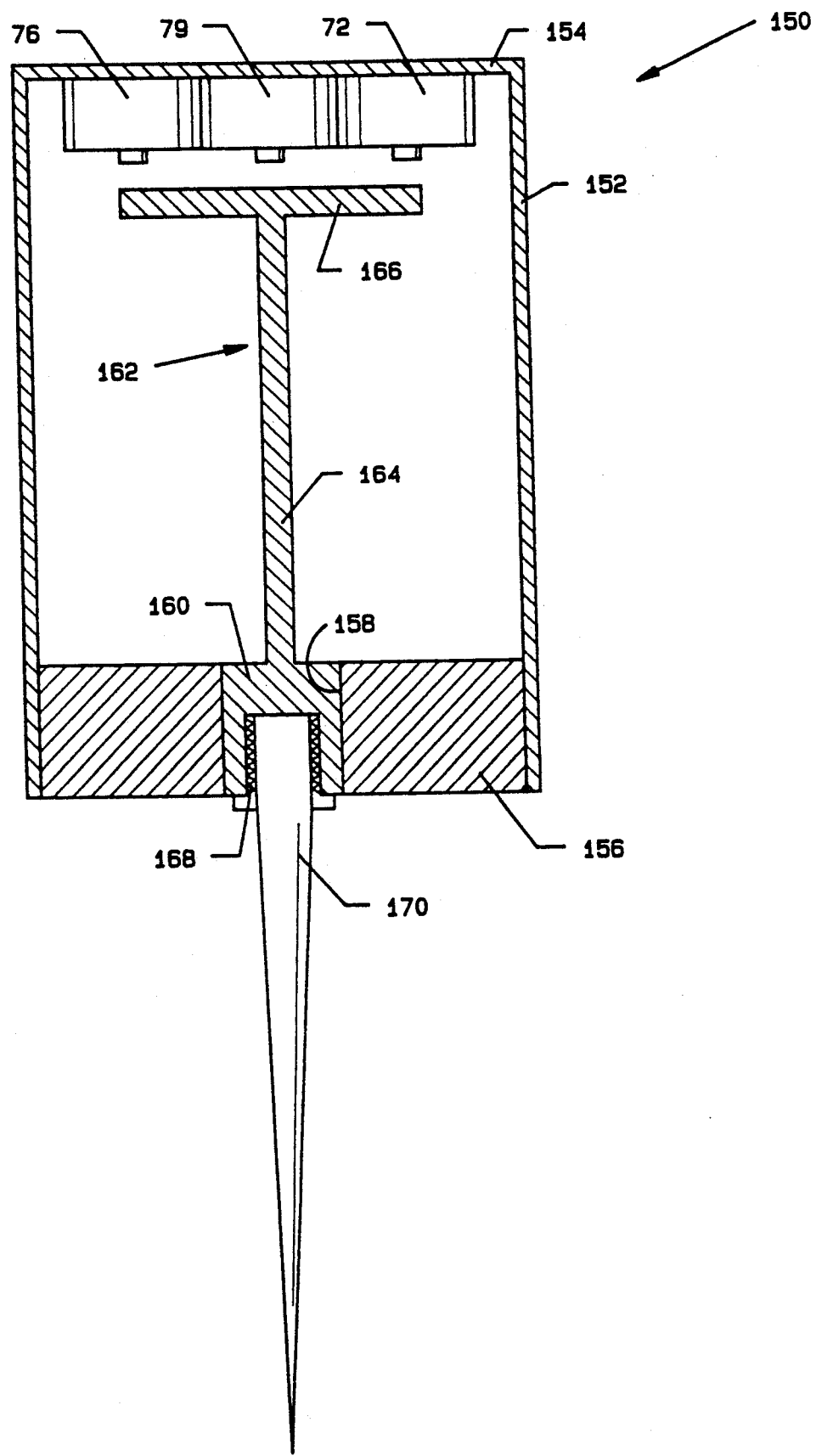
FIG. 9 illustrates an alternative embodiment of the present invention in partial cross section; and, FIG. 10 illustrates an alternative embodiment of the present invention in partial cross section.

FIG. 9 illustrates an alternative embodiment of the present invention in partial cross section which employs the concepts discussed above where parts are used in an identical manner to the system described above, they all have the same reference numerals.

Indicator 150 includes a housing 152. Center coil 79 and pickup coils 72-78 are mounted in top 154 of housing 152. Essentially, the system of indicator 150 is turned upside down relative to the indicator as discussed above, such as indicator 4. The bottom of housing 152 is sealed with flexible plug 156. Plug 156 is preferably made of vulcanized rubber approximately an inch thick. An opening 158 is provided through plug 156 for receiving base 160 of armature 162. Opening 158 is preferably about ¼" in diameter. Armature 162 includes a shaft 164 and disk 166. Disk 166 operates in the same manner as bottom base 88 as discussed above. Base 160 is provided with a threaded hole 168. Rod 170 is threaded into hole 168. It can be seen that the same principals as discussed above apply to the indicator 150. As rod 170 is moved in any direction, armature 162 moves so that disk 166 moves relative to coils 72-78. Coils 72-78 pickup movement and position of disk 166.

One application of indicator 150 is for sensing water speed and direction, such as in a river. Indicator 150 may be fixed to a stationary object so that the direction and speed of the river is sensed. Indicator 150 may be mounted on a boat so that water flowing past the hull is sensed so that the boat's speed relative to the water and its direction relative to the water are known. The four pickup coils 72-78 may be vectorially summed to determine water direction and speed.

Rod 170 is preferably a flexible rod such as graphite of the type used in fishing rods. A flexible rod is preferred so that it would bend if it strikes an object in the water. As the boat moves, more water moves relative to the boat, it moves rod 170 which moves armature 162. Plug 156 is flexible so that all movement of rod 170 is transmitted directly through to armature 162.

Whether the boat is moving forward or backward or there is side slip, direction and speed are sensed through coils 72-78.

Figure 10:
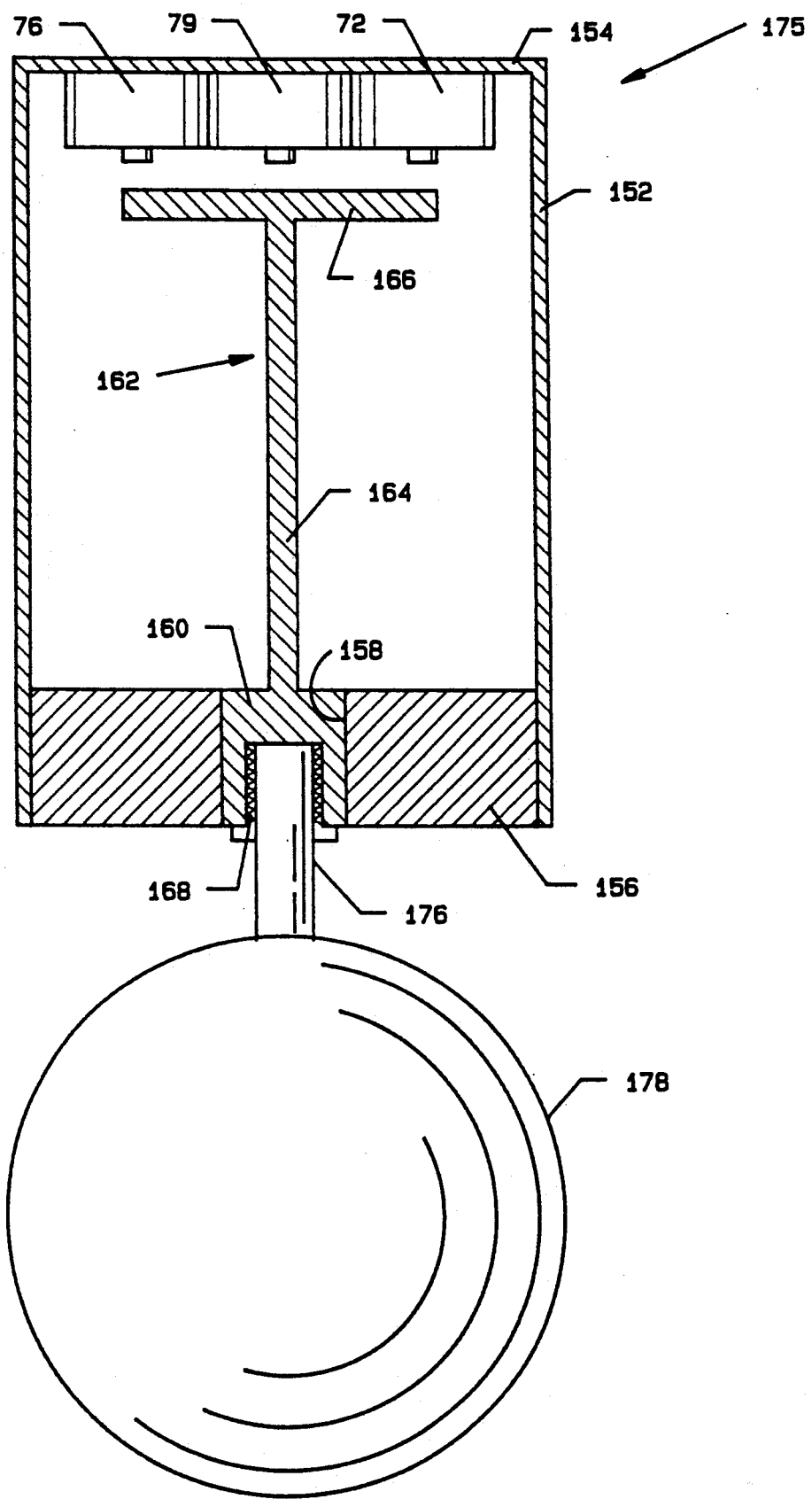

FIG. 10 illustrates an alternative embodiment of the present invention in partial cross section which employs the concepts discussed above where parts are used in an identical manner to the system described above, they all have the same reference numerals.

Indicator 175 includes a housing 152. Center coil 79 and pickup coils 72-78 are mounted in top 154 of housing 152. Essentially, the system of indicator 175 is turned upside down relative to the indicator as discussed above, such as indicator 4. The bottom of housing 152 is sealed with flexible plug 156. Plug 156 is preferably made of vulcanized rubber approximately an inch thick. An opening 158 is provided through plug 156 for receiving base 160 of armature 162. Opening 158 is preferably about ¼" in diameter. Armature 162 includes a shaft 164 and disk 166. Disk 166 operates in the same manner as bottom base 88 as discussed above. Base 160 is provided with a threaded hole 168. Rod 176 is threaded into hole 168. A ball 178 attaches to the rod 176. It can be seen that the same principals as discussed above apply to the indicator 175. As the rod 176 and ball 178 are moved in any direction, armature 162 moves so that disk 166 moves relative to coils 72-78. Coils 72-78 pickup movement and position of disk 166.

One application of the indicator 175 is for sensing water speed and direction, such as in a river. The entire indicator 175 may be submerged and fixed to a stationary object so that the direction and speed of the river is sensed. Indicator 175 may be submergedly mounted on a boat so that water flowing past the hull is sensed so that the boat's speed relative to the water and its direction relative to the water are known. The four pickup coils 72-78 may be vectorially summed to determine water direction and speed.

Rod 176 is preferably a flexible rod such as graphite of the type used in fishing rods. A flexible rod is preferred so that it would bend if it strikes an object in the water. As the boat moves, more water moves relative to the boat, it moves rod 176 and ball 178 which moves armature 162. Plug 156 is flexible so that all movement of rod 176 by the ball 178 is transmitted directly through to armature 162.

Whether the boat is moving forward or backward or there is side slip, direction and speed are sensed through coils 72-78.

MODE OF OPERATION

The mode of operation for the angular momentum and banking indicator 10 which is adjusted through the screw 50 and the acceleration and deceleration grade indicator 10 which is adjusted through the screw assembly 28 provides adjustment for the unit which can be appropriately installed in a vehicle including trains, plains, ships, cranes or any other suitable vehicle which moves in any direction and is not limited to movement across a surface. This would include planes, cranes, and ships. The grade indicator system 10 requires minimal installation such as securing to a base of a vehicle and then placing the display in view of an operator.

The grade indicator system 10 is particularly useful for truck drivers such as tractor-trailer drivers to view acceleration and deceleration as well as banking around curves so as to appropriately time their shifting of the gears as well as braking.

The grade indicator system 10 is also useful for crane operators indicating the degree of tilt of the crane.

Preferred use of this system may very well be in trucks and trains.

Another use of the sensing device is for a rail lubricator for trains so that the proper rails on a curve are lubricated during a turning action. Rail lubrication systems have become important because of the high cost of energy as well as the time, motion and expense in replacing rails because of extended wear.

Various modifications can be made to the present invention without departing from the apparent scope hereof.

I claim:

1. A system for oiling track on a moving train comprising:
   a. a housing;
   b. a pendulum suspended in the housing having a ferrous disk, the pendulum having a center rest position;
   c. a center power coil for connection to a source of alternating current, the center power coil being mounted in the housing below the rest position of the pendulum;
   d. a set of at least four sensing coils arranged symmetrically above the center power coil in the housing for sensing magnetic flux as the pendulum moves from its rest position and for producing position signals indicative of the distance of the disk from each sensing coil; and,
   e. control logic for receiving the position signals and for vectorially summing the signals to determine train speed and bank and for providing an oil signal when speed is not appropriate for the bank.

2. A water speed and direction indicator comprising:
   a. a housing having a top;
   b. a flexible bottom mounted in the housing;
   c. a center power coil mounted in the top for connection to a source of AC power;
   d. a set of at least four sensing coils symmetrically spaced about the center coil and the top;
   e. an armature mounted in the flexible bottom for movement within the housing, the armature having a vertical shaft with a ferrous disk at its top, the disk having a rest position below the center coil; and,
   f. a rod mounted to the armature through the flexible bottom for extending into the water so that deflection of the rod by the water is reflected in angular movement of the armature and housing, each sensing coil providing a signal indicative of the distance of th disk from the sensing coil.

* * * * *